G. W. DILLON.
NUT LOCK.
APPLICATION FILED MAY 19, 1916.
1,252,554.
Patented Jan. 8, 1918.
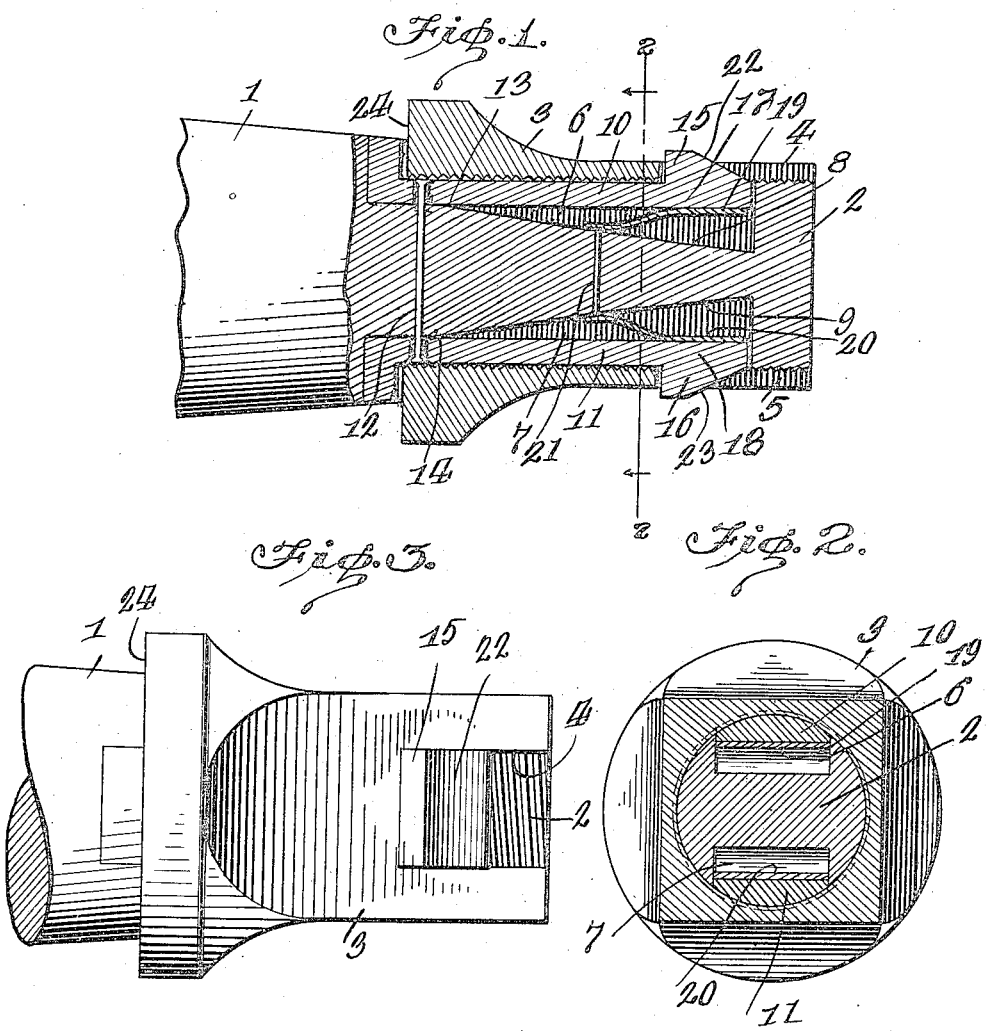

UNITED STATES PATENT OFFICE.

GEORGE W. DILLON, OF DES MOINES, IOWA.

NUT-LOCK.

1,252,554.     Specification of Letters Patent.     Patented Jan. 8, 1918.

Application filed May 19, 1916. Serial No. 98,623.

*To all whom it may concern:*

Be it known that I, GEORGE W. DILLON, a citizen of the United States, residing at Des Moines, in the county of Polk and State of Iowa, have invented certain new and useful Improvements in Nut-Locks, of which the following is a specification.

This invention has reference to a nut lock and particularly to a nut lock designed to be used in connection with the wheel retaining nut of a vehicle spindle, and has for its primary object to provide a locking means adapted to positively retain the wheel retaining nut in place upon the threaded terminal of the spindle.

Another object is to provide a locking device adapted to prevent the wheel retaining nut from being turned off of the threaded terminal when the vehicle is propelled in a backward direction.

A further object is to provide the threaded terminal of a spindle with a pair of oppositely disposed longitudinal slots in which are mounted spring actuated latch bars, the said latch bars being projected into oppositely disposed rectangular cut-out portions provided in the outer end of the wheel retaining nut, the said slots being cut deeper at one end than at the other to provide depressions into which the spring actuated latch bars may be pressed when the wheel retaining nut is being engaged in the threaded terminal of the spindle.

With these and other objects in view the invention consists of the construction and combination of the various parts as will be hereinafter more fully described and pointed out in the appended claims.

In the drawings:—

Figure 1 is a transverse section illustrating the relation of the various parts when the wheel retaining nut is in locked position, Fig. 2 is a section upon the line 2—2 of Fig. 1 looking in the direction of the arrow, and Fig. 3 is a plan view illustrating the manner in which the latch bar engages the rectangular cut-out portion of the wheel retaining nut.

Referring to the drawings by numerals, 1 indicates the usual spindle provided with the reduced nut receiving terminal 2 provided with threads upon which a wheel retaining nut 3 is adapted to be advanced in the usual manner, said nut being elongated and provided at its outer end with oppositely disposed rectangular cut-out portions 4 and 5. A pair of longitudinally extending slots 6 and 7 are provided in the spindle, beginning in the spindle proper and terminating a short distance from the outer end of the threaded terminal 2. As will be readily seen, the slots 6 and 7 gradually increase in depth, as at 8 and 9, toward the outer ends thereof for a purpose which will presently appear. Latch bars 10 and 11 mounted in the slots are loosely secured therein by means of a pin 12, said latch bars adapted to be fulcrumed at the points 13 and 14 in order that the outer ends thereof may be depressed into the deepened portions of the slots 6 and 7. The latch bars 10 and 11 have vertical projections 15 and 16 formed upon their outer ends 17 and 18, said projections being normally projected beyond the surface of the terminal 2 and into the rectangular cut-out portions 4 and 5 of the wheel retaining nut 3, by means of leaf springs 19 and 20 secured in the slots 6 and 7 by the pin 21. It will be apparent from the above construction that the projections 15 and 16 will positively prevent the turning of the nut upon the terminal.

The operation of the device is as follows:

The wheel retaining nut 3 is engaged in the threaded terminal 2 and is advanced upon the same until it engages the beveled surfaces 22 and 23 of the latch bars thereby depressing the outer ends of said bars into the deepened portions of the slots 6 and 7, whereupon said nut is advanced farther upon the threaded terminal until its inner face 24 engages the shoulder formed at the junction of the spindle proper and the reduced terminal 2, which movement will bring the cut-out portions 4 and 5 of the nut in alinement with the outer ends of the slots 6 and 7, whereupon the leaf springs 19 and 20 will project the vertical projections 15 and 16 of the latch bars into said rectangular cut-out portions, thereby preventing rotation of the wheel retaining nut upon the terminal 2 when the vehicle is moved in a backward direction.

In removing the nut 3 from the threaded terminal 2 it will be very readily seen that by exerting pressure upon the outer ends of the latch bars that the same may be depressed into the slots 6 and 7 against the tension of the leaf springs 19 and 20, thereby permitting the nut to be rotated and readily removed from said terminal.

While it will be seen from the above description taken in connection with the drawings that I have provided a device clearly operable and efficient for the purpose described, I do not claim the exact construction shown, but reserve the right to make certain minor changes and alterations as will not depart from the spirit and scope of the appended claims.

What I claim is:

1. The combination with a spindle provided with a threaded terminal, of a wheel retaining nut engaging said terminal and having its walls cut away at its outer end to form a slot, spring actuated means carried by the threaded terminal and having a portion projecting through the slot to lock the nut against rotation and to form a finger engaging part to depress the same and release the nut.

2. The combination with a spindle provided with a threaded terminal, of a wheel retaining nut engaging with the said terminal and having slots in its outer end extending through the walls, said terminal having a pair of oppositely disposed, longitudinally extending slots, a latch bar mounted in each of said slots and provided with vertical projections upon the outer ends for engaging with the slots in the nut, a pin passing through the terminal and engaging with said latch bars, and resilient means located in the slots and engaging with the latch bars to normally retain said projections in engagement with the slots in the nut.

3. The combination with a spindle provided with a threaded terminal, of a wheel retaining nut engaging with said terminal, having a pair of oppositely disposed, longitudinally extending slots gradually increasing in depth toward the outer end, a latch bar in each slot provided with vertical projections upon the outer ends for engagement with the slots in the nut, a pin passing through the terminal upon which the latch bars are pivoted, leaf springs in said slots engaging said latch bars pressing the same outwardly and a pin passing through the terminal and engaging the leaf springs to hold them in place.

4. The combination with a spindle provided with a threaded terminal, of a wheel retaining nut engaging with said terminal and having a slot at its outer end, said threaded terminal provided with a longitudinally extending slot gradually increasing in depth toward the outer end, a latch bar mounted in said slot and provided with a vertical projection at the outer end thereof for engagement with the slot in the nut, said projection having an inclined portion starting below the circumference of the terminal and resilient means for forcing the latch outwardly.

In testimony whereof I affix my signature in presence of two witnesses.

GEORGE W. DILLON.

Witnesses:
GEORGE F. TROTTER,
J. H. ANDERSON.

Copies of this patent may be obtained for five cents each, by addressing the "Commissioner of Patents, Washington, D. C."